United States Patent [19]

Thompson

[11] Patent Number: 5,271,282
[45] Date of Patent: Dec. 21, 1993

[54] SENSOR FOR LANCE-TYPE SHOT PEENING GUNS

[75] Inventor: Robert A. Thompson, Quaker Street, N.Y.

[73] Assignee: General Electric Company, Schenectady, N.Y.

[21] Appl. No.: 992,363

[22] Filed: Dec. 17, 1992

[51] Int. Cl.⁵ .............................................. G01L 25/00
[52] U.S. Cl. ...................................... 73/862.08; 72/53
[58] Field of Search .......................... 72/53; 73/862.08

[56] References Cited

U.S. PATENT DOCUMENTS

| | | |
|---|---|---|
| 3,654,786 | 4/1972 | Koenecke et al. .................... 72/53 |
| 4,805,429 | 2/1989 | Thompson . |
| 4,848,123 | 7/1989 | Thompson .............................. 72/53 |
| 4,977,775 | 12/1990 | Grabovac et al. ............... 73/862.08 |

Primary Examiner—Richard E. Chilcot, Jr.
Assistant Examiner—R. Biegel
Attorney, Agent, or Firm—Paul R. Webb, II

[57] ABSTRACT

This invention relates to sensors of the type that are used in lance-type shot peening guns. Such structures of this type, generally, measure the reaction force of the ejected shot and air stream which are emitted from the lance-type shot peening gun. The sensor further supplies diagnostic information indicative of the shot peening process performance.

5 Claims, 1 Drawing Sheet

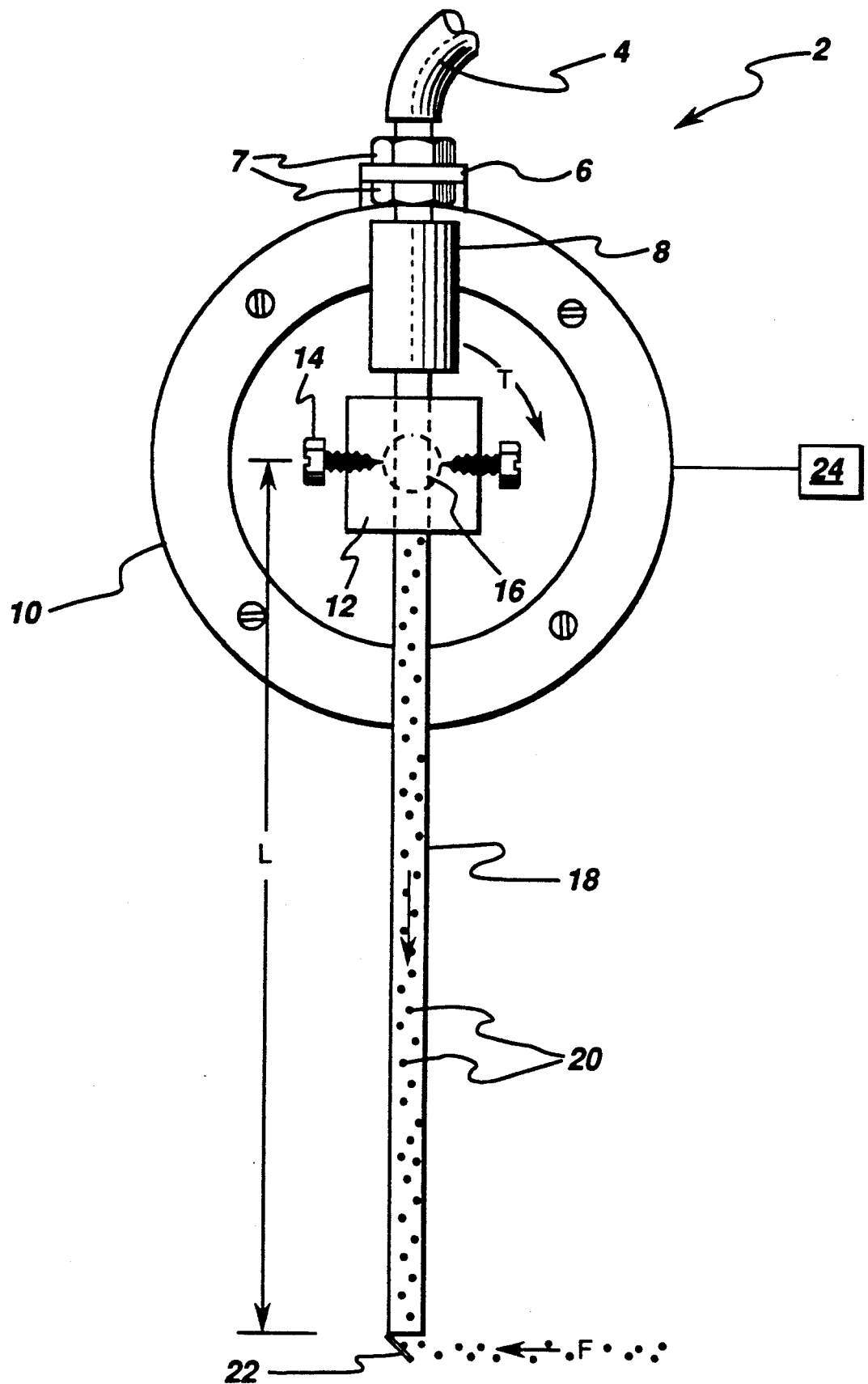

SENSOR FOR LANCE-TYPE SHOT PEENING GUNS

BACKGROUND OF THE INVENTION

1. Field of the Invention

This invention relates to sensors of the type that are used in lance-type shot peening guns. Such structures of this type, generally, measure the reaction force of the ejected shot and air stream which are emitted from the lance-type shot peening gun. The sensor further supplies diagnostic information indicative of the shot peening process performance.

2. Description of the Related Art

The need for a shot peening process monitor is well known. Exemplary of such shot peening process monitors is U.S. Pat. No. 4,805,429 ('429) to R. A. Thompson, entitled "Shot Peening System and Method with Velocity Sensing" and assigned to the same assignee as the present invention. The '429 patent describes the importance of measuring shot velocity as well as having a gun mounted process monitor. The '429 patent discloses a gun mounted reaction force sensor to gather the information required to meet the needs for conventional shot peen guns. Lance-type shot peening guns, however, are different than conventional guns.

In general, lance-type shot peening guns are connected to pressure pot machines. The lance-type guns consist of a tube at the end of which a tungsten carbide deflector faces a hole in the tube wall at an angle of 45° to the tube's axis. Thus, shot swept through the lance at high velocity by high pressure air is deflected at right angles to the lance's axis and propelled against the workpiece. In addition, the long slender lance tube (about ½" in diameter × 12" long) is often tailored by bending to reach areas which are inaccessible to conventional guns, for example, the inside of bores. For these reasons, the force sensing scheme used in the '429 patent is not readily adaptable to lance-type shot peening guns. Therefore, a more advantageous sensor, then, would be presented if the reaction force sensor were adaptable to lance-type shot peening guns.

It is apparent from the above that there exists a need in the art for a sensor which is capable of measuring the reaction force due to the ejected shot and air from the shot peening gun, and which at least equals the measuring characteristics of the known conventional shot peening guns, particularly those of the highly advantageous type disclosed in the above-reference Thompson patent, but which at the same time is capable of being adapted to a lance-type shot peening gun. It is a purpose of this invention to fulfill this and other needs in the art in a manner more apparent to the skilled artisan once given the following disclosure.

SUMMARY OF THE INVENTION

Generally speaking, this invention fulfills these needs by providing a force sensor for a lance-type shot peening gun, comprising a lance-type shot peening gun having a pressure pot means and a lance, a holding means for holding said lance and a reaction force sensor means operatively connected to said holding means.

In certain preferred embodiments, the holding means is a sensor/lance adaptor. Also, the reaction sensor means is a torque sensor. Finally, the sensor includes a strain gauge.

In another further preferred embodiment, the shot velocity in a lance-type shot peening gun can be accurately measured.

The preferred force sensor, according to this invention, offers the following advantages: lightness in weight; easy assembly and repair; excellent shot velocity measuring characteristics; good stability; good durability; good economy and high strength for safety. In fact, in many of the preferred embodiments, these factors of easy assembly, excellent shot velocity measuring characteristics and durability are optimized to an extent that is considerably higher than heretofore achieved in prior, known sensors for shot peening guns.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing Figure in which the single Figure is a schematic illustration of a lance-type shot peening gun with a reaction force sensor, according to the present invention.

DETAILED DESCRIPTION OF THE INVENTION

With reference to FIG. 1, there is illustrated lance-type shot peening gun sensor system 2. System 2, includes, in part, hose 4, hose anchor 6, coupling 8, torque sensor 10, sensor/lance adaptor 12, conventional fasteners 14, shaft 16, lance 18, shot 20, deflector tip 22 and strain gauge 24. In particular, hose 4 is a conventional hose which is attached to a conventional pressure pot (not shown). Hose anchor 6 is a conventional hose anchor and is rigidly attached to hose 4 by conventional fasteners 7. Coupling 8 is rigidly attached to hose anchor 6 and lance 18. Coupling 8, preferably, is constructed of any suitable durable, elastomeric material.

Lance 18 is retained within sensor/lance adaptor 12. Adaptor 12, preferably, is constructed of any suitable metallic material. Adaptor 12 is rigidly held on shaft 16 of torque sensor 10 by conventional fasteners 14. Torque sensor 10, preferably, is a reaction torque sensor, Model No. 2105-500, manufactured by the Eaton Corporation, Troy, Mich. Located at the other end of lance 18 is a conventional deflector tip 22.

During the operation of system 2, the velocity of the stream of shot 20 ejected from lance 18 is equal to the reaction force (F) required to accelerate shot 20 divided by the shot mass flow rate ($\dot{m}$). The novel aspect of system 2 is the remote torque sensor 10 which is used to measure the reaction force (F) for the lance-type shot peening gun system 2. In this case, lance 18 is mounted at its base to the shaft 16 of the torque sensor 10 as illustrated in FIG. 1. The nozzle reaction force (F) is calculated from the torque measurement as measured by the torque sensor 10.

The nozzle reaction force (F) is determined by noting that torque (T) equals the force (F) applied to the end of a moment arm multiplied by the arm's length (L). Therefore, if the sensed torque is T and the arm's length from the mounting point to the shot ejection hole is L, the reaction force, F, due to the ejected stream of shot 20 and air is:

$$F = T/L \qquad (1)$$

If the shot stream is not ejected at right angles to the nozzle, the force is $$F = T/(L\sin(\theta)) \quad (2)$$

where $\theta$ is the angle between the shot vector and the axis of lance 18.

For a typical peening operation utilizing system 2, the nozzle reaction force (F) is about 1 lb. Assuming a 12 inch long lance 18, the sensed torque (T) would be $$T = 16 \times 12 = 192 (oz\text{-}in) \quad (3)$$

Thus, to give a margin of safety, a 500 oz-in sensor was chosen for adequate safety considerations. In conjunction with the Model No. 2105-500 sensor 10, a Model No. 7530-105 strain gage transducer indicator 24, also manufactured by the Eaton Corporation with an adjustable span can be used. Here, the span can be adjusted to eliminate the 1/L factor in equation (1) or the 1/(L sin ($\theta$)) in equation 2, depending upon which applies, so that the reaction force (F) can be read directly from the instrument.

Measurement of gun reaction force (F) by the torque sensor 10 has three distinct advantages over a conventional gun mounted sensor as discussed in the above-referenced '429 patent. First, the sensing element 10 of the present invention is remote from the point where shot 20 is ejected. Second, the lance 18 acts as a lever arm which mechanically amplifies the shot stream reaction force (F), thus increasing the signal to noise ratio of system 2. Third, all types of shot, including magnetic and non-magnetic shot, can be utilized in system 2.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A force sensor for a lance-type shot peening gun, wherein said sensor is comprised of:
    a lance-type shot peening gun having a pressure pot means and a lance;
    a holding means for holding said lance; and
    a reaction force sensor means operatively connected to said holding means wherein said reaction force sensor means is further comprised of:
    a reaction torque sensor.

2. The sensor, as in claim 1, wherein said holding means is further comprised of:
    a sensor/lance adaptor.

3. The sensor, as in claim 2, wherein said reaction force sensor means is further comprised of:
    a shaft operatively connected to said sensor/lance adaptor.

4. The sensor, as in claim 1, wherein said force sensor is further comprised of:
    a flexible coupling means operatively connected between said pressure pot means and said lance.

5. The sensor, as in claim 1, wherein said sensor is further comprised of:
    a strain gauge means operatively connected to said reaction force sensor means

* * * * *